UNITED STATES PATENT OFFICE.

PERCY T. COOK, OF GRAND RAPIDS, MICHIGAN, ASSIGNOR, BY DIRECT AND MESNE ASSIGNMENTS, TO THE BORALUMINE COMPANY, OF SAME PLACE.

PREPARATION FOR COVERING WALLS, CEILINGS, &c.

SPECIFICATION forming part of Letters Patent No. 269,388, dated December 19, 1882.

Application filed October 17, 1882. (No specimens.)

*To all whom it may concern:*

Be it known that I, PERCY T. COOK, of Grand Rapids, in the county of Kent and State of Michigan, have invented a new and improved compound for protecting, beautifying, and preserving all surfaces, walls, and ceilings, whether of brick, stone, wood, metal, or plaster, the formula for preparing which is given in the following specification.

I take of raw pulverized gypsum ninety-eight pounds, of pulverized alum one and one-half pound, of pulverized borax one-half pound, and after mixing thoroughly calcine the mass with strong heat. Then I add seven and one-half pounds of pulverized glue or gum-arabic, and mix thoroughly, when the compound is ready for transportation.

For use, water, either hot or cold, is added to the compound to reduce it to the consistency of paint. It is then applied with a brush, like paint, when it slowly sets, forming a smooth, hard, and durable surface, that may be polished to a high degree of brilliancy.

Any desired tint or color may be given to the surface by adding to the compound, at any time before using, suitable pigments.

The effect of the glue or gum-arabic is to delay the setting of the mixture, so that it may be applied with a brush at leisure, as in painting. The effect of the alum and borax is to make the compound capable of resisting heat, and to increase the density, hardness, and brilliancy of the surface, so that it may be highly polished, and, when soiled, washed with water without deterioration.

This compound makes a good and durable paint for wood, metal, stone, brick, or plaster, and will set firmly on all surfaces.

The use of glue I do not claim as my invention, it having been in use for many years in compounds of chalks, limes, and other materials.

I do not claim as my invention a compound of gum or adhesive matter with plaster and coloring-matter in a dry state, or a compound of pulverized plaster-of-paris with finely-pulverized glue or other binding material and coloring-matter in a dry state.

What I claim as my invention, and desire to secure by Letters Patent, is—

The herein-described composition to be used in admixture with water as a paint for covering walls, ceilings, &c., consisting of a calcined compound of gypsum, alum, and borax, and pulverized dry glue added to the said calcined compound, the materials specified being mixed in proportions substantially as before set forth.

PERCY T. COOK.

Witnesses:
W. B. FRELIGH,
R. C. HATHEWAY.